United States Patent [19]

Stoops et al.

[11] 4,141,929
[45] Feb. 27, 1979

[54] UNIDIRECTIONAL SHEET MOLDING COMPOSITION AND PROCESS OF PREPARING SAME

[75] Inventors: Reginald B. Stoops, Gainesville, Fla.; John M. Maxel, St. Charles, Ill.

[73] Assignee: Armco Inc., Middletown, Ohio

[21] Appl. No.: 521,750

[22] Filed: Nov. 7, 1974

[51] Int. Cl.$^2$ ............................................. C08F 43/08
[52] U.S. Cl. .............................. 260/862; 156/178; 156/179; 260/863; 260/865; 264/112; 264/113; 264/145; 264/160; 264/320; 264/331
[58] Field of Search ............... 264/171, 331, 112-113, 264/160, 320, 137; 260/862-865; 156/178-179

[56] References Cited

U.S. PATENT DOCUMENTS

| 2,784,763 | 3/1957 | Shorts | 156/201 |
|---|---|---|---|
| 2,927,623 | 3/1960 | Huisman et al. | 156/179 |
| 3,077,000 | 2/1963 | Huisman et al. | 156/205 |
| 3,183,287 | 5/1965 | Fischer | 264/160 |
| 3,701,748 | 10/1972 | Kroekel | 264/331 |
| 3,716,431 | 2/1973 | Townsend et al. | 156/179 |
| 3,801,693 | 2/1974 | Stallings | 264/331 |
| 3,836,600 | 9/1974 | Brewbaker et al. | 260/862 |
| 3,842,142 | 10/1974 | Harpold et al. | 260/862 |
| 3,852,376 | 12/1974 | Bando et al. | 260/862 |
| 3,864,427 | 2/1975 | Nakane | 260/862 |

*Primary Examiner*—Jeffery R. Thurlow
*Attorney, Agent, or Firm*—Richard L. Johnston

[57] ABSTRACT

A thickened, dry, handable sheet molding composition is prepared containing continuous axially aligned filaments in a layer of a sheet molding compound which can be molded between compression dies to produce articles of high mechanical strength such as hammer handles, channel and angle stock, and other structural applications.

15 Claims, 4 Drawing Figures

UNIDIRECTIONAL SHEET MOLDING COMPOSITION AND PROCESS OF PREPARING SAME

BACKGROUND

It is well known in the art to produce various types of articles such as fishing rods, pole vault poles, and other articles in which filaments, e.g., glass filaments, are embedded in resins. Such articles are commonly produced by a process known as the "pultrusion" process. It would be desirable in the art to prepare such articles by other processes which are more versatile, particularly with respect to the composition of the article.

Articles of this type as heretofore made have excellent parallel flexural strength but leave much to be desired from the standpoint of strength in a direction normal or perpendicular to the continuous filaments.

OBJECTS

One of the objects of the present invention is to produce new and useful dry, handable, thickened, resinous sheet molding compositions containing axially aligned continuous filaments and suitable for compression molding between matched dies.

Another object is to provide a process of making new and improved articles in which continuous filaments of high modulus elasticity are axially aligned.

A further object of the invention is to provide compression molded articles having improved flexural strength as well as improved tensile strength in a direction perpendicular or normal to the continuous filaments.

Other objects and advantages of the invention will appear from the following description in conjunction with the accompanying drawings.

THE DRAWINGS

BRIEF SUMMARY OF THE INVENTION

Figure 1:
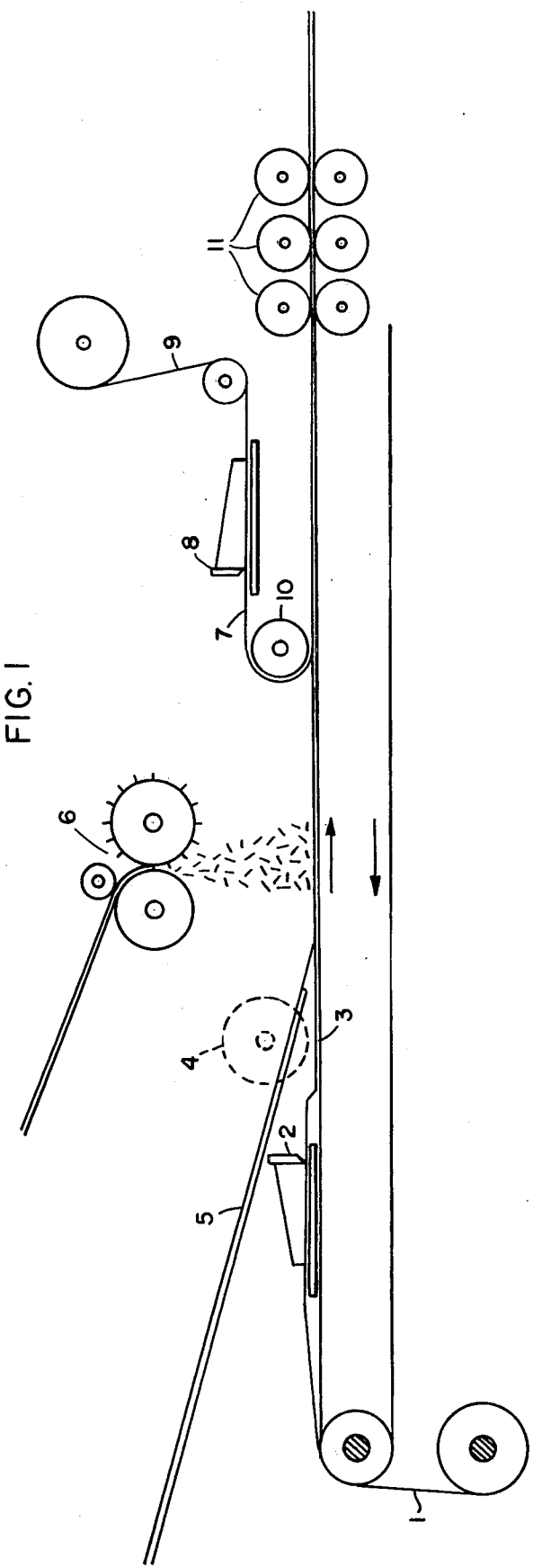
FIG. 1 illustrates diagrammatically one form of the process employed in the practice of the invention.

A resinous sheet molding composition containing axially aligned continuous filaments is made by preparing a mixture of an unsaturated cross linkable polyester of a dicarboxy acid and a dihydric alcohol, a liquid cross linking monomer capable of cross linking with said polyester to produce a thermosetting resin, a catalyst for the cross linking reaction, an inhibitor for the cross linking reaction, and a mold release compound, adding a thickening reactant to said mixture, stirring the resultant mixture, applying said mixture into a controlled layer onto a strippable carrier sheet, adding 10% to 70% by weight of continuous high modulus elasticity filaments unidirectionally to said layer, and applying a second layer of said mixture and a second strippable sheet to the top of said layer to produce a molding sheet in which said continuous filaments are embedded unidirectionally in said resinous molding sheet.

In the practice of the invention cut bundles of glass filaments may be added to said layer in random fashion prior to the addition of said second strippable sheet. Also after the addition of said second strippable sheet the layer is preferably kneaded between said strippable sheets to cause the filaments, including cut glass filaments if present, to be distributed uniformly in the interior of the layer.

It is usually desirable to employ a filler, for example, clay, calcium carbonate or other filler which is mixed with the resin, monomer and other ingredients prior to the addition of the thickener.

Another optional ingredient is a thermoplastic low shrink resin such as, for example, polystyrene or an acrylic polymer.

The sheet molding compound is aged at 90° F. (could be 6°–120° F.) for 2 to 3 days (could be 1–14 days) until the viscosity of the compound paste reaches a viscosity of $30-50 \times 10^6$ cps (could be $2-100 \times 10^6$ cps). The sheet molding compound is now ready for molding.

The molding process may be carried out by stripping said strippable sheets from said layer, cutting said layer into segments of a size suitable for molding a predetermined article between compression dies, placing said segments between solid smooth heated male and female compression dies so that said segments cover the molding surfaces of said dies, and molding said article by compression between said dies at a temperature sufficiently high (usually 300°–325° F.) to cause cross linking to occur between said polyester and said cross linking monomer.

DETAILED DESCRIPTION OF THE INVENTION

In the foregoing process an unsaturated polyester can be used. The polyester preferably contains one or more dicarboxy acids such as, for example, maleic, fumaric, isophthalic and/or phthalic, or an anhydride of such acids where available in the anhydride form which is reacted with a dihydric alcohol in which the hydroxyl groups are connected by ethylene, diethylene, propylene, dipropylene, trimethylene, neopentyl, or saturated or unsaturated homologues thereof.

The inhibitor is preferably para-benzoquinone but can be another inhibitor of a similar type (quinone or hydroquinone) which functions in a similar manner to inhibit cross linking of the polyester at temperatures below its melting temperature.

If a chemically inert powdered filler is employed, good results have been obtained by using a clay filler. Other chemically inert powdered fillers, for example, calcium carbonate, usually having an average particle size of about two microns with a maximum of about 30 microns, hydrated alumina, talc, and the like, may be used. Where a filler is employed good results have been obtained by using a weight percentage of filler to total resin components within the range of 10% to 200%.

The catalyst is preferably tertiary butyl perbenzoate but other peroxide type catalysts can be used.

The mold release compound is preferably zinc stearate but other similar types of mold release compounds such as, for example, calcium stearate, can be employed.

A pigment can be added to the sheet molding composition preferably at a stage prior to the addition of the thickening reactant.

The pigment can be an inorganic pigment or an organic pigment or a mixture of an inorganic and an organic pigment. Examples of suitable inorganic pigments are Molybdenum Orange and Cadmium Red. Other suitable pigments are carbon black, titanium dioxide, phthalocyanine blue, and other light stable chemically inert organic pigments. The pigment is preferably added in the process in the form of a dispersion in a low molecular weight liquid polyester.

The thickening reactant is preferably magnesium oxide. Other thickening reactants that can be employed are, for example, the oxides and hydroxides of calcium, magnesium, strontium and barium which are in Class II(a) of the Periodic Table of Elements. Magnesium oxide is preferred because it apparently has just the right properties to bring about the desired thickening reaction in a suitable period of time. This thickening reaction is believed to involve a cross linking between the metal of the thickening reactant and carboxy and/or hydroxy groups attached to linear chains of the polyester.

The continuous filaments can be glass rovings, graphite, carbon, boron, or organic filaments, or other filaments which have flexural stiffness, i.e., a high modulus of elasticity. In general filaments having a Young's modulus of at least $2 \times 10^6$ psi and preferably within the range of $2-30 \times 10^6$ psi are preferred.

Glass rovings usually contain 60 strands each having 204 glass filaments.

Where cut bundles of glass filaments are added to the sheet molding composition it is usually preferable to use cut or chopped glass rovings having lengths from ¼ inch to 3 inches.

If continuous high modulus elasticity filaments are employed alone, as much as 70% by weight can be used. In the preferred practice of the invention where both continuous filaments and cut filaments are employed in the same products, the amount of cut filaments preferably corresponds to 5-100% by weight of the continuous filaments and the total weight of the continuous filaments and the cut filaments is within the range of 30% to 70% by weight of the sheet molding composition.

The resultant mixture obtained by stirring or agitating all of the components has a Brookfield viscosity within the range of 15,000 to 150,000, preferably 50,000 to 100,000 centipoises at 77° F., and is therefore quite thick but is still pourable so that it can be poured onto the strippable carrier sheet and converted into a thick layer usually around ⅛ to 3/16 inch in thickness by passing the carrier sheet containing said mixture beneath a doctor blade, the lower end of which is spaced from the carrier sheet a distance corresponding to the desired thickness of the layer. The doctor blade forms a dam beneath which the mixture passes. Continuous filaments are fed unidirectionally into the layer. If cut bundles of glass filaments are added they are added to the top of the layer. A second layer of said mixture and a second strippable carrier sheet are then applied over the continuously moving layer to form a sandwich and the resultant sandwich is kneaded between alternately spaced rollers so as to cause the filaments to be distributed uniformly in the interior of the combined layers. The second layer may be applied to one side of the second carrier sheet after which the direction of the second carrier sheet is reversed to bring the two layers together.

The resultant composite thickened resinous molding sheet is then aged in the manner previously described until a dry handable composite sheet is obtained from which said strippable sheet can be stripped and which is then suitable for compression molding between matched dies.

It should be noted that the amount of catalyst is usually within the range of 1.0% to 2% of the total resin forming components. The amount can vary with different catalysts and an overall range would be 0.5 to 4.0%.

The amount of inhibitor can be 50 to 1000 parts per million (ppm) depending on the kind and amount of catalyst.

The molding temperatures are usually within the range of 300° F. to 325° F. Other temperatures can be used depending on the catalyst and the inhibitor employed.

The pressures used in the compression molding process are usually within the range of 500 to 1000 psig.

The invention will be further illustrated but is not limited by the following examples in which the quantities are by weight unless otherwise indicated.

EXAMPLE I

The process was carried out in the manner previously described using the following ingredients:

| Ingredients | Parts by Weight |
|---|---|
| Unsaturated cross linkable polyester solution in styrene containing 40 parts styrene and 60 parts of a polyester formed by reacting isophthalic acid, maleic anhydride and propylene glycol in a mole ratio of 1:1:2.2 to which is added 200 ppm of hydroquinone inhibitor | 25.380 |
| Tertiary butyl per-benzoate (catalyst) | 0.382 |
| Zinc stearate (mold release) | 0.761 |
| Clay filler | 20.273 |
| Pigment | 1.176 |
| Styrene monomer | 1.015 |
| Magnesium hydroxide thickener | 1.013 |
| Continuous glass roving | 25.000 |
| Chopped glass roving one inch length | 25.000 |

The ingredients were added in the order listed and the mixing procedure was carried out in the manner previously outlined.

The resulting resin paste was then metered onto a carrier 1 made of polyethylene, polypropylene, or other suitable material, by means of an adjustable doctor blade 2. This coated film was then carried at a controlled rate through the ensuing process on a belt 3 or series of rollers. The axially aligned continuous glass filaments were fed from rolls or rovings packages onto the coated film, uniformly spaced optionally by the use of grooved rollers 4 or feed tubes 5. The coated film, with the continuous filaments in place were then passed under a chopper 6 or similar device for the deposition of a controlled and uniform layer of chopped or cut filaments. A second coated film 7 was formed by metering an additional quantity of the resin paste by means of an adjustable doctor blade 8 onto one side of a second carrier film 9 which was then reversed in direction over roller 10 and then applied to the top of the layer. The resulting sandwich construction was then passed through a kneading apparatus 11 to compact the sandwich and insure complete wetting and/or coating of the filaments.

Figure 2:
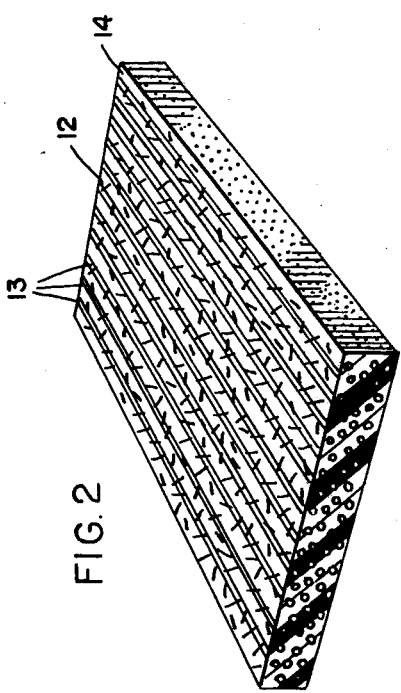
FIG. 2 is a perspective view of a sheet molding composition made in accordance with the practice of the present invention.

After ageing in the manner previously described the strippable sheets 2 and 9 can be removed from the sheet molding composition to give a sheet molding material 12 as shown in FIG. 2 containing continuous filaments 13 which are axially aligned and cut filaments 14 which are disposed in random fashion in the interstices between the continuous filaments, all of said filaments being embedded in the resinous layer.

Figure 4:
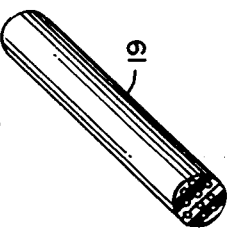
FIG. 4 is a perspective view of a rod-like article obtained by molding the sheet molding material of FIG. 2 between compression dies as illustrated in FIG. 3.
Figure 3:
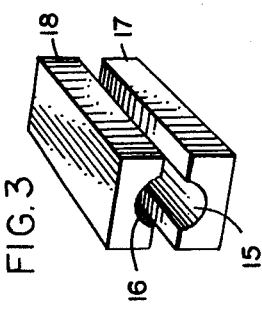
FIG. 3 is a perspective view illustrating diagrammatically a pair of compression dies used to form a rod-like article from the sheet molding composition illustrated in FIG. 2.

The sheet molding composition is then cut into segments which just cover the mold surfaces 15 and 16 of dies 17 and 18. The dies are heated and compressed together using a molding temperature within the range of 300° F. to 320° F. and a compression pressure of 500 to 1000 psig. In this way a rod-like article 19 as shown in FIG. 4 is formed which has not only high strength in a parallel direction but also in a perpendicular direction.

Using a sheet molding composition as described in this example containing 25% chopped and 25% unidirectional glass filaments a molded article is obtained having the following physical properties:

| Flexural Strength psig | |
|---|---|
| Parallel | Perpendicular |
| 80,000 | 24,000 |
| Flexural Modulus psig | |
| Parallel | Perpendicular |
| $3.2 \times 10^6$ | $1.5 \times 10^6$ |
| Tensile Strength psig | |
| Parallel | Perpendicular |
| 42,000 | 10,000 |
| Izod Impact Strength Unnotched | |
| Parallel | Perpendicular |
| 56 | 18 |

The terms "parallel" and "perpendicular" refer to the direction of the continuous filaments in the molded product.

From the standpoint of distribution of the filaments in the sheet molding composition, good results have been obtained by employing approximately 48 continuous glass rovings per 12 inch width of sheet approximately ⅛ inch to 3/16 inch thick.

The molding cycle is usually one to three minutes depending upon the thickness of the layer.

EXAMPLE II

The procedure was the same as in Example I except that the weight ratio of continuous filaments to chopped filaments to resin paste was 25:20:55. The molded product had a parallel flexural strength of 67,222 psig, a perpendicular flexural strength of 17,633 psig, a parallel tensile strength of 36,475 psig, a perpendicular tensile strength of 7,169 psig, an unnotched parallel Izod of 40.18 and an unnotched perpendicular Izod of 16.22.

EXAMPLE III

The procedure was the same as in Example I except that the weight ratio of continuous glass filaments to chopped glass filaments to resin paste was 36:24:40. The parallel flexural strength of the molded article was 106,638 psig, the perpendicular flexural strength was 21,643 psig, the parallel tensile strength was 71,681 psig, the perpendicular tensile strength was 8,726 psig, an unnotched parallel Izod was 61.79 and an unnotched perpendicular Izod was 12.67.

EXAMPLE IV

The procedure was the same as in Example I except that the weight ratio of continuous glass filaments to resin paste was 70:30 and no chopped glass filaments were added. The parallel flexural strength of the molded article was 151,180 psig, the perpendicular flexural strength was 6,216, the parallel tensile strength was 80,413 psig, the perpendicular tensile strength was 3,923 psig, unnotched parallel Izod was 73.72 and an unnotched perpendicular Izod was 3.41.

From the foregoing examples it will be seen that the total weight percent of glass filaments vaired from approximately 45% to approximately 70%. While the molded product of Example IV had the highest parallel flexural strength and the highest parallel tensile strength it also had the lowest perpendicular flexural strength and the lowest perpendicular tensile strength as well as the lowest unnotched perpendicular Izod. The optimum all around results were obtained with a total glass filament weight percent of approximately 45% to 60% and with a weight ratio of continuous glass filaments to chopped glass filaments within the range of 3:2 to 1:1.

While tertiary butyl perbenzoate is the preferred catalyst, other types of organic peroxides which are soluble in the hydrophobe or resin phase can be employed, e.g., benzoyl peroxide, acetyl benzoyl peroxide, cumene hydroperoxide, and other oil soluble oxygen supplying catalysts.

While styrene is the preferred cross linking monomer, other monomeric aryl compounds having an unsaturated side chain can be employed, e.g., vinyl toluene, vinyl ethylbenzene, alpha methylstyrene, vinylchlorobenzenes, vinyl xylenes, and diallylphthalate.

Thermoplastic polymers optionally useful in the present compositions include, for example, polystyrene, copolymers of styrene and lower alkyl esters of acrylic and methacrylic acids, and copolymers of styrene with minor amounts of one or more of the following: lauroyl methacrylate, isobornyl methacrylate, acrylamide, hydroxyethylmethacrylate, 2-ethylhexyl acrylate, acrylonitrile, methacrylic acid, methacrylamide, methylol acrylamide, and cetyl stearyl methacrylate. Other useful examples of the thermoplastic polymer are vinyl chloride/vinyl acetate copolymers, and caprolactone polymers.

The invention is especially useful in making articles in which high parallel strength is desired and particularly articles where both high parallel strength and relatively high perpendicular strength are desired. Among such articles are hammer handles, channel and angle structures, as well as a wide variety of other structural articles. The present process for making such articles is superior to processes heretofore in use such as filament winding processes which require rather complex winding machines and pultrusion processes in which the production rates are relatively slow and the costs are therefore relatively high. Another difficulty with pultrusion processes is that pultrusion dies need refinishing and replating after 50,000 to 100,000 feet of product whereas in compression molding of a sheet molding composition in accordance with the present process the dies are not subject to the same amount of abrasion as in the pultrusion process.

In general, if chopped or cut filaments are added to compositions of the type described herein, the weight ratio of chopped filaments to continuous filaments will be within the range of 1:20 to 4:1.

It will be understood that the inhibitor for the cross linking reaction may be contained in the resin as supplied by a resin manufacturer.

The strippable sheets used in the foregoing process are usually polyolefine film, the example, polyethylene or polypropylene, but can be any type of sheets having a surface from which the aged molding sheet can be separated.

Although others have made articles in which continuous strands are embedded in resins the processes usually involve the formation of sheets which are corrugated or otherwise formed and the end product completely cured so that it cannot be further processed in a matched die compression molding. In the present invention a thickened resinous sheet molding composition is produced in which the catalyst for curing the resin remains latent due to the presence of the inhibitor and at the same time due to the thickening step and the subsequent aging step a dry handable composite sheet is obtained which is suitable for compression molding between matched dies.

The invention is hereby claimed as follows:

1. A process of preparing a thickened resinous sheet molding composition suitable for compression molding containing axially aligned continuous filaments and cut filaments which comprises preparing a slurry of an unsaturated cross linkable polyester of a dicarboxy acid and a dihydric alcohol, a liquid cross linking monomer capable of cross linking with said polyester to produce a thermosetting resin, a catalyst for the cross linking reaction, an inhibitor for the cross linking reaction, and a mold release compound, adding a thickening reactant to said mixture, stirring the resultant mixture, forming said mixture into a first layer on a strippable carrier sheet, adding 10% to 70% by weight of continuous high modulus elasticity filaments unidirectionally to said layer, adding randomly deposited cut filaments to said layer, applying a second layer of said composition and a second strippable sheet to the top of said layer to produce a composite molding sheet in which said continuous filaments are embedded unidirectionally in said resinous molding sheet, and ageing said composite molding sheet until a dry handable composite sheet is obtained from which said strippable sheets can be stripped and which is then suitable for compression molding between matched dies.

2. A process as claimed in claim 1 in which a thermoplastic resin is intimately dispersed with said composition before said layers are formed.

3. A process as claimed in claim 1 in which a powdered filler is intimately dispersed with said composition before said layers are formed.

4. The product resulting from the process of claim 1.

5. A process as claimed in claim 1 in which said continuous filaments have a Young's Modulus of elasticity of at least $2 \times 10^6$ pounds per square inch.

6. A process as claimed in claim 1 in which said continuous filaments have a Young's Modulus of elasticity within the range of $2 \times 10^6$ to $30 \times 10^6$ pounds per square inch.

7. A process as claimed in claim 1 in which said continuous filaments are selected from the group consisting of glass filaments, graphite filaments, carbon filaments, boron filaments and organic filaments.

8. A process as claimed in claim 1 in which said continuous filaments are glass filaments.

9. A process as claimed in claim 1 in which said continuous filaments are graphite filaments.

10. A process as claimed in claim 1 comprising adding cut bundles of glass filaments to said layer in random fashion in amounts such that the weight ratio of cut filaments to continuous filaments is within the range of 1:20 to 4:1.

11. A process as claimed in claim 1 comprising the additional steps of (1) stripping said strippable sheets from said layer, (2) cutting said layer into segments of a size suitable for molding a predetermined article, (3) placing said segments in a mold between solid smooth heated male and female compression dies so that said segments cover the molding surfaces of said dies, and (4) molding said article by compression between said dies at temperatures sufficiently high to cause cross linking to occur between said polyester and said cross linking monomer.

12. A process as claimed in claim 10 comprising the additional steps of (1) stripping said strippable sheets from said layer, (2) cutting said layer into segments of a size suitable for molding a predetermined article, (3) placing said segments in a mold between solid smooth heated male and female compression dies so that said segments cover the molding surfaces of said dies, and (4) molding said article by compression between said dies at temperatures sufficiently high to cause cross linking to occur between said polyester and said cross linking monomer.

13. The product resulting from the process of claim 10.

14. The product resulting from the process of claim 11.

15. The product resulting from the process of claim 12.

* * * * *